United States Patent
Kuramoto et al.

(10) Patent No.: US 6,716,128 B2
(45) Date of Patent: Apr. 6, 2004

(54) CLUTCH AND INFINITELY VARIABLE TRANSMISSION

(75) Inventors: Hiroaki Kuramoto, Kanagawa (JP); Toshikazu Oshidari, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/021,077

(22) Filed: Dec. 19, 2001

(65) Prior Publication Data

US 2002/0094904 A1 Jul. 18, 2002

(30) Foreign Application Priority Data

Jan. 15, 2001 (JP) ........................................ 2001-006407

(51) Int. Cl.[7] .............................................. F16D 25/06
(52) U.S. Cl. .................... 475/207; 192/45; 192/54.5; 192/85 AA
(58) Field of Search ..................... 192/45, 54.5, 48.1, 192/48.92, 52.5, 54.52, 85 A, 85 AA, 35; 475/207

(56) References Cited

U.S. PATENT DOCUMENTS

| | | | | | |
|---|---|---|---|---|---|
| 2,827,994 A | * | 9/1958 | Tiedman et al. | ............ | 192/93 A |
| 3,199,374 A | * | 8/1965 | O'Malley et al. | .............. | 475/55 |
| 3,674,118 A | * | 7/1972 | Klaue | .......................... | 188/72.2 |
| 3,688,882 A | * | 9/1972 | O'Malley | ............... | 192/85 AA |
| 3,733,920 A | * | 5/1973 | Annis | .......................... | 475/136 |
| 5,031,746 A | * | 7/1991 | Koivunen | ............... | 192/85 AA |
| 5,106,348 A | * | 4/1992 | Koivunen | .................... | 475/126 |
| 5,464,084 A | * | 11/1995 | Aoki et al. | ..................... | 192/35 |
| 5,593,016 A |  | 1/1997 | Murata et al. | ........... | 192/85 AA |
| 5,701,983 A | * | 12/1997 | Matsumoto et al. | ........... | 192/35 |
| 5,725,079 A | * | 3/1998 | Matsumoto et al. | ........ | 192/52.5 |
| 5,980,420 A |  | 11/1999 | Sakamoto et al. | ............. | 476/10 |

FOREIGN PATENT DOCUMENTS

| | | |
|---|---|---|
| JP | 7-279992 | 10/1995 |
| JP | 10-267117 | 10/1998 |
| JP | 10-325459 | 12/1998 |

* cited by examiner

*Primary Examiner*—Saul Rodriguez
(74) *Attorney, Agent, or Firm*—Foley & Lardner

(57) ABSTRACT

A clutch apparatus includes a torque cam mechanism and a clutch actuator for compressing a clutch disc pack for clutch engagement through the torque cam mechanism. The clutch actuator includes a first fluid chamber for pushing the torque cam mechanism from a first position for all-time clutch disengagement, to a second position toward the clutch disc pack, and a second fluid chamber for pushing the torque cam mechanism from the second position to a third position for all-time clutch engagement toward the clutch disc pack. At the second position, the torque cam mechanism functions as a one-way clutch by extending axially in response to relative rotation between both sides in one rotational direction.

17 Claims, 11 Drawing Sheets

P, N RANGE

D RANGE, DRIVE (ONE-WAY CLUTCH ON)

D RANGE, COAST (ONE-WAY CLUTCH OFF)

R RANGE, ENGINE BRAKE

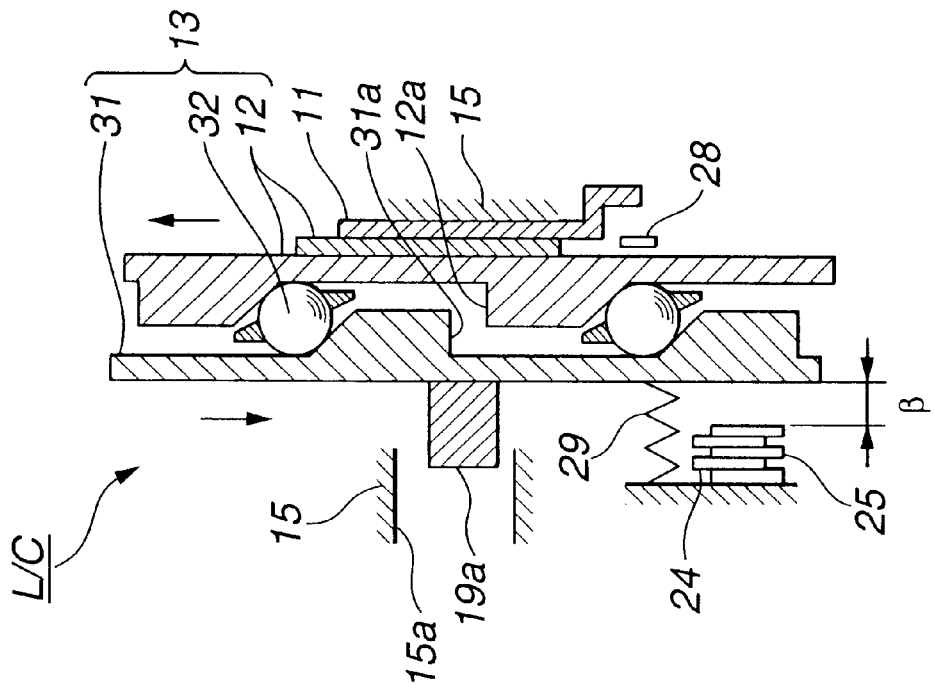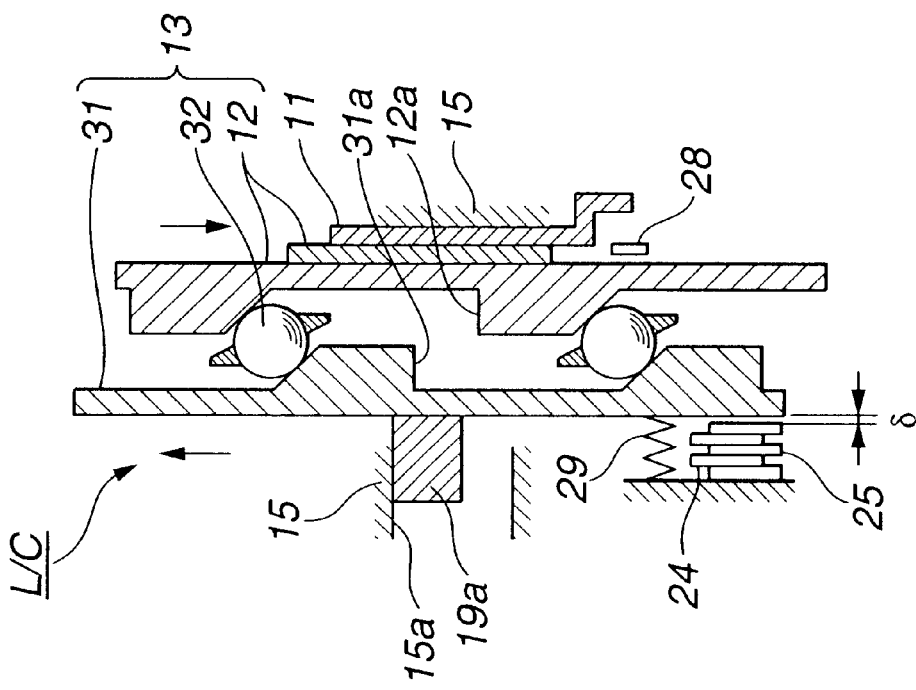

FIG.9A
DRIVE (ONE-WAY CLUTCH ON)
Fex < F1

FIG.9B
DRIVE (ONE-WAY CLUTCH ON)
Fex > F1

FIG.9C
COAST (ONE-WAY CLUTCH OFF)

DRIVE
(ALL-TIME ENGAGEMENT)

COAST R RANGE
(ALL-TIME ENGAGEMENT)

CLUTCH AND INFINITELY VARIABLE TRANSMISSION

BACKGROUND OF THE INVENTION

The present invention relates to clutches and transmissions for transmitting torque, and to clutches adapted to be used in a transmission system such as a transmission system including a continuously variable transmission.

A U.S. Pat. No. 5,593,016 (corresponding to a published Japanese Patent Application Publication (Kokai) No. H07-279992) shows a wet type multiple disc clutch including therein a torque cam mechanism interposed between a clutch disc pack and a clutch piston, and constructed to serve as a one-way clutch.

SUMMARY OF THE INVENTION

However, once this clutch is engaged, the clutch remains engaged until a driving force is applied in an opposite direction, even if the clutch piston is withdrawn by drainage of fluid pressure. In this clutch, relative rotation on both sides of the cam mechanism, required for the effect of a cam mechanism, is produced by pressing the torque cam mechanism against the clutch disc pack by applying the fluid pressure on the piston. Accordingly, even after the fluid pressure is removed, the torque cam mechanism continues pressing the clutch disc pack until a driving force in the opposite direction is applied.

It is an object of the present invention to provide a clutch apparatus capable being restored to a disengaged state by switching a clutch actuator, such as a hydraulic actuator including a clutch piston, from an actuated state to an unactuated state.

According to the present invention, an apparatus (such as a clutch apparatus or an infinitely variable transmission) for transmitting torque, comprises: a clutch pack of friction elements; a clutch actuator to produce a clutch action to compress the clutch pack axially for clutch engagement, the actuator comprising a clutch piston to move toward the clutch pack when the clutch piston is actuated; and a torque cam mechanism interposed between the clutch pack and the clutch piston. The torque cam mechanism comprises a cam member to extend the torque cam mechanism axially in response to a relative rotation between both ends of the torque cam mechanism. The torque cam mechanism is arranged to compress the clutch pack axially when the clutch piston is actuated and simultaneously the torque cam mechanism is extended axially.

According to another aspect of the present invention, a clutch apparatus comprises: first means for making driving connection for clutch engagement by surface friction when compressed and breaking the driving connection when released; second means for compressing the first means to effect the clutch engagement; third means for producing a clutch action to force the second means to compress the first means when the third means is actuated; fourth means, interposed between the first means and the third means, for allowing the third means to force the second means to compress the first means through the fourth means by producing an axial force to force the second means away from third means toward the first means when the fourth means receives drag torque from the first means through the second means; and fifth means for preventing the first means from being compressed even if the axial force is produced by the fourth means in response to the drag torque when the third means is not actuated.

According to still another aspect of the present invention, a clutch apparatus comprises: a clutch pack of clutch discs; a pressure member to compress the clutch pack axially for clutch engagement; a first piston to produce a clutch action to compress the clutch pack with the pressure member when the first piston is actuated by a first fluid pressure; a second piston arranged to be moved from a first position to a second position toward the clutch pack by the first piston when actuated, and further from the second position to a third position toward the clutch pack when the second piston is actuated; a friction reducing device, interposed between the second piston and the pressure member, to increase an axial distance between the pressure member and the second piston with the aid of a contoured cam surface when the second piston and the pressure member are rotated relative to each other, and thereby to push the pressure member to compress the clutch pack when the second piston is held at the second position; a shift stopper to prevent the clutch pack from being compressed when the distance between the pressure member and the second piston is not increased, by holding the second piston at the second position by limiting axial movement of the first piston; a return spring to normally hold the second piston at the first position to prevent the clutch pack from being compressed irrespective of whether the distance between the pressure member and the second piston is extended or not.

The other objects and features of this invention will become understood from the following description with reference to the accompanying drawings.

BRIEF DESCRIPTION OF THE DRAWINGS

FIGS. 8A and 8B are sectional views of a torque cam mechanism in the low clutch in the all-time disengaged state.

FIG. 8A shows the torque cam mechanism in an extended state.

FIG. 8B shows the torque cam mechanism in an unextended state.

FIGS. 9A, 9B and 9C are sectional views for illustrating the function of one-way clutch performed by the torque cam mechanism.

FIGS. 9A and 9B show the torque cam mechanism extended into the one-way clutch ON state.

FIG. 9C shows the torque cam mechanism which is not extended and hence held in the one-way clutch OFF state.

FIG. 10A shows the torque cam mechanism in the extended state.

FIG. 10B shows the torque cam mechanism in the unextended state.

DETAILED DESCRIPTION OF THE INVENTION

Figure 13:
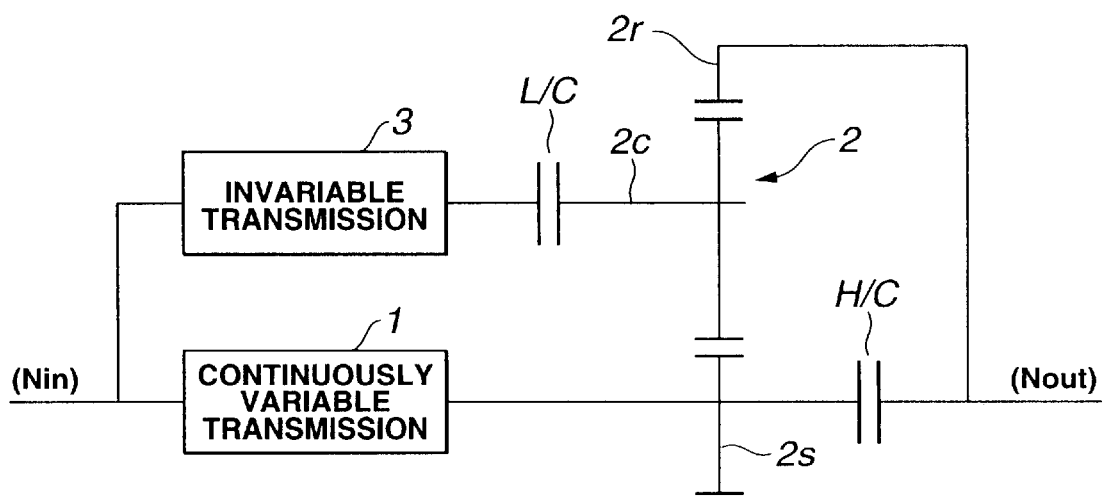
FIG. 13 is a block diagram showing the infinitely variable transmission according to the embodiment of the present invention.

FIG. 13 schematically shows an infinitely variable transmission (IVT) according to one embodiment of the present invention. The infinitely variable transmission can expand a range of speed ratio as compared to a V-belt continuously variable transmission and a toroidal continuously variable transmission. Moreover, the infinitely variable transmission can produce a vehicle stopping state by increasing the speed ratio (input speed/output speed) to infinity (the output speed is zero) without breaking the mechanical driving connection and without requiring a hydrodynamic drive such as a torque converter.

Basic components of the infinitely variable transmission are: a continuously variable transmission (CVT) 1, a planetary gear set 2, an invariable transmission 3, a low clutch L/C (or a power recirculation clutch) and a high clutch H/C (or a direct clutch).

A series combination of invariable transmission 3 and low clutch L/C is connected between the input side of CVT 1 and a first element of planetary gear set 2. CVT 1 is connected to a second element of planetary gear set 2. In a power recirculation mode, input rotation to CVT 1 is transmitted through invariable transmission 3 and low clutch L/C to the first element (which in this example is a planet carrier 2c). In this state, power is circulated through the second element (which in this example is a sun gear 2s) from the output member of CVT 1 to the input member of CVT 1. Recirculating power is taken out as an output rotation from a third element (a ring gear 2r) of planetary gear set 2.

This infinitely variable transmission is changed over from the power recirculation mode to the direct (connection) mode by disengaging low clutch L/C and instead engaging high clutch H/C (CVT direct connection clutch). In the direct mode, output rotation is taken out directly from the output member of CVT 1 through high clutch H/C.

Figure 12:
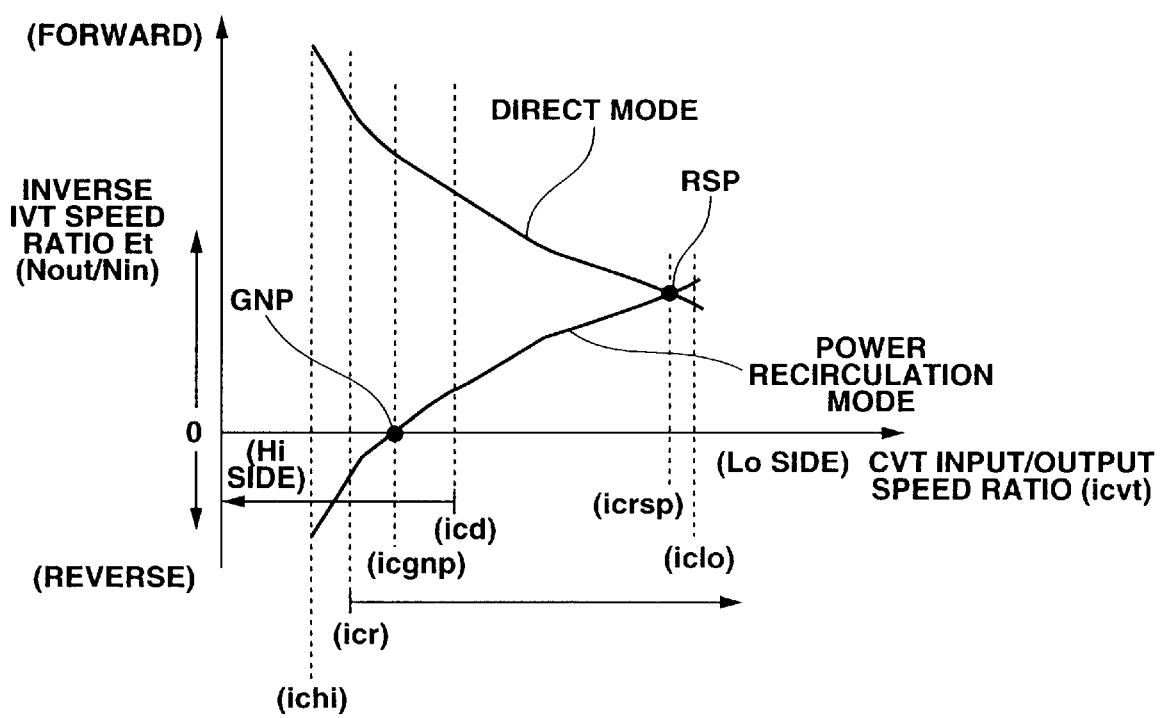
FIG. 12 is a graph showing a relationship between an inverse IVT speed ratio Et and a CVT speed ratio (icvt) for illustrating operations of the transmission system according to the embodiment of the present invention.
Figure 14:
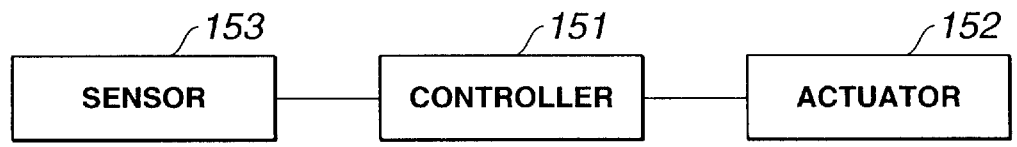
FIG. 14 is a block diagram showing a shift control system according to the embodiment of the present invention.

A controller 151 shown in FIG. 14 controls an IVT input/output speed ratio (input speed Nin/output speed Nout) by controlling a CVT input/output speed ratio icvt with a shift actuator 152 in accordance with operating conditions collected by a sensor section 153, as shown in FIG. 12.

Mode changeover between the power recirculation mode and direct mode is carried out by operating low clutch L/C and high clutch H/C at a revolution synchronous point RSP at which the speeds of the driving side and the driven side of each of low and high clutches L/C and H/C are equal to each other. In the power recirculation mode where the inverse IVT speed ratio Et (Nout/Nin) which is the inverse of the IVT input/output speed ratio (Nin/Nout) is on the lower side of the RSP, this IVT transmission system can set the CVT input/output speed ratio icvt of CVT 1 equal to a certain ratio icgnp, and thereby reduce the output rotation transmitted to the third element (ring gear 2r in this example) to zero. At this point called a geared neutral point GNP, the output rotational speed Nout of IVT is reduced to zero, and hence the IVT transmission system can hold the vehicle at a rest state without disconnecting the mechanical driving connection, by increasing the input/output speed ratio to infinity.

In power recirculation mode, the IVT transmission system can provide output rotation in the reverse direction for backward vehicle movement by setting the CVT input/output speed ratio on the high (Hi) side of the ratio of icgnp at geared neutral point GNP. On the low side of geared neutral point GNP, the transmission system increases the output speed in the forward direction by varying the CVT speed ratio to the lower side (toward RSP).

When the CVT speed ratio icvt reaches a ratio icrp during the forward vehicle operation, the speeds of the second and third elements (2s and 2r) of planetary gear set 2 (the driving side and driven side of high clutch H/C) become equal to each other at synchronous point RSP. At this point, the transmission can change the operating mode from power recirculation mode to the direct mode smoothly by engaging high clutch H/C and disengaging low clutch L/C. In direct mode, the speed ratio of CVT 1 is reflected directly in the speed ratio of IVT. Changeover from direct mode to power recirculation mode can be performed smoothly at synchronous point RSP at which the speeds of the driving side and driven side of low clutch L/C become equal to each other, by engagement of low clutch L/C and disengagement of high clutch H/C.

Figure 1:
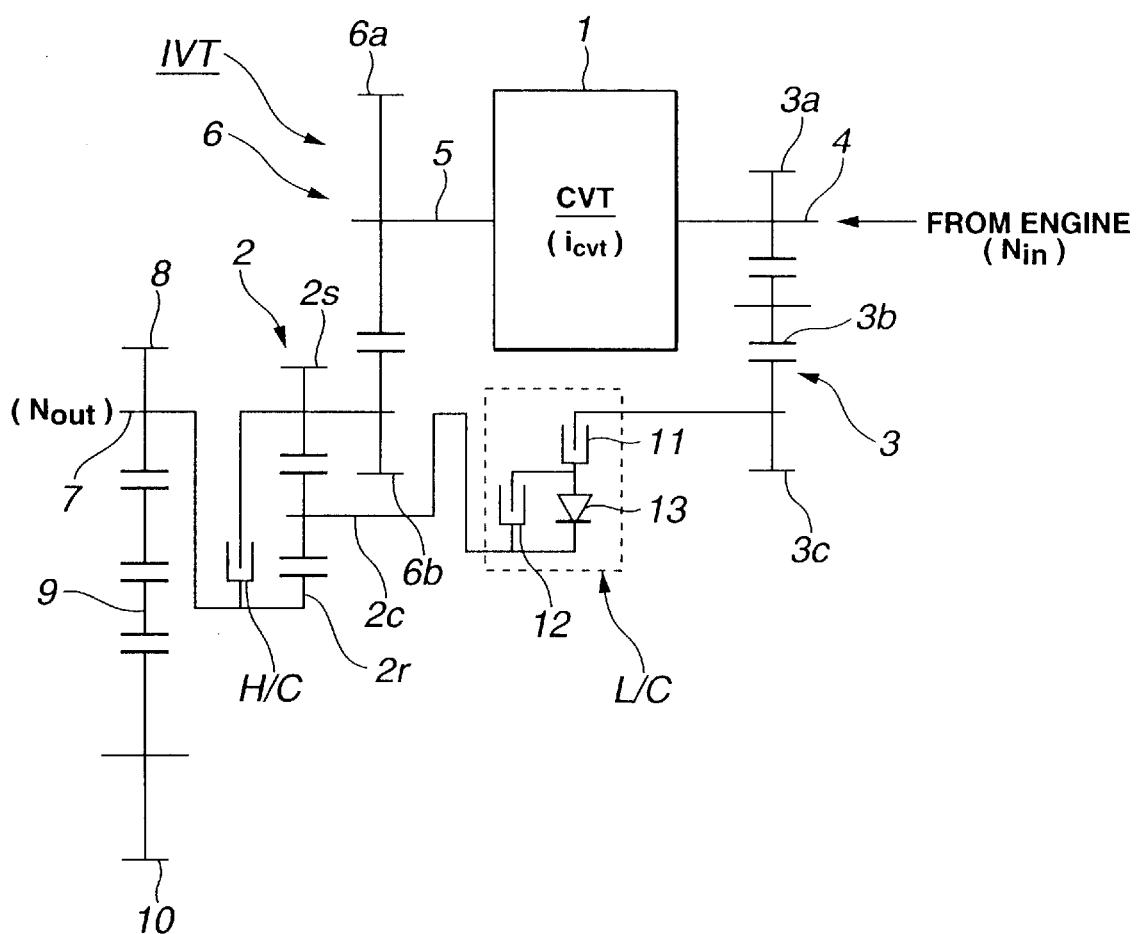
FIG. 1 is a schematic view of an infinitely variable transmission including a clutch apparatus according to one embodiment of the present invention as a low clutch.

FIG. 1 shows the infinitely variable transmission (IVT) according to the embodiment of the invention more in detail. In this transmission, a clutch apparatus according to the embodiment of the present invention is installed as low clutch L/C (power circulating clutch). Infinitely variable transmission IVT of the example shown in FIG. 1 includes, as a main component, continuously variable transmission (CVT) 1 of toroidal type, and further includes planetary gear set 2, invariable transmission 3, low clutch L/C, and high clutch H/C (CVT direct connection clutch) which are combined with toroidal CVT 1.

An input shaft 4 of toroidal CVT 1 serves as an input member of the IVT, and is arranged to receive rotation from an engine (which, in this embodiment, is a prime mover of a motor vehicle). Toroidal CVT 1 transmits input rotation from input shaft 1, to an output shaft 5 at a continuously variable speed ratio.

Planetary gear set 2 is a simple planetary gear set including a sun gear 2s (second element), a planet carrier 2c (first element) and a ring gear 2r (third element). Invariable (or constant) transmission 3 of this example is a gear train of gears 3a, 3b and 3c, as shown in FIG. 1. Invariable transmission 3 is a transmission having a fixed gear ratio. In this example, invariable transmission 3 is a reduction gearing.

Input rotation can be transmitted through toroidal CVT 1 on one hand, and transmitted, on the other hand, through constant transmission 3 and low clutch L/C successively, to carrier 2c of planetary gear set 2.

Sun gear 2s of planetary gear set 2 is drivingly connected with an output shaft 5 of toroidal CVT 1, through a gear set 6 including gears 6a and 6b. Ring gear 2r of planetary gear set 2 is connected with an output shaft 7 of IVT. Gears 8, 9 and 10 are arranged to take out rotation from the IVT output shaft 7. High clutch H/C (CVT direct connection clutch) is provided between IVT output shaft 7 and the sun gear 2s of planetary gear set 2 connected with output shaft 5 of toroidal CVT 1 through gear set 6, and arranged to permit connection or disconnection between sun gear 2s and IVT output shaft 7. Thus, high clutch H/C can provide direct connection between IVT output shaft 7 and CVT output shaft 5.

Figure 2:
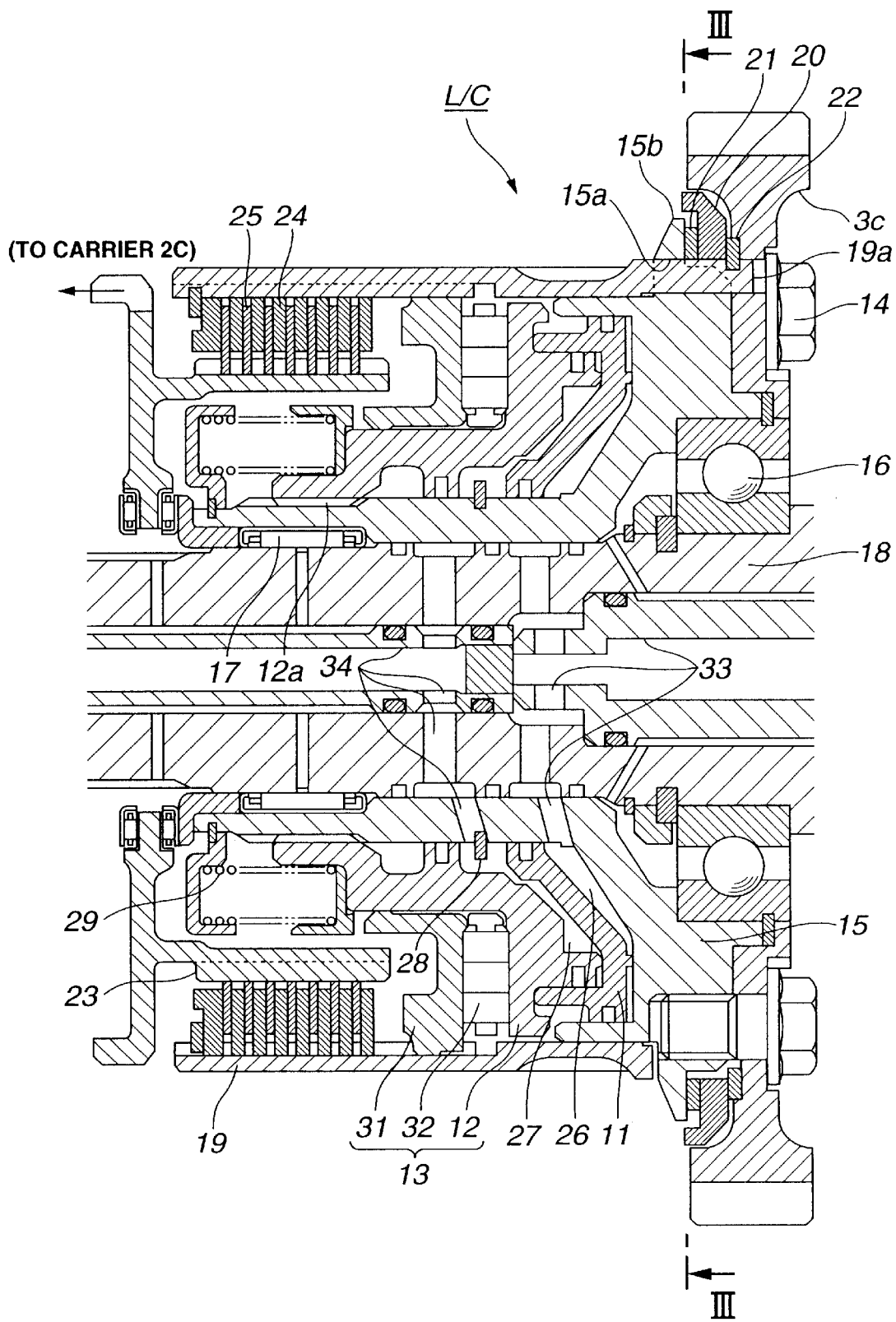
FIG. 2 is a vertical sectional view showing the low clutch shown in FIG. 1.

A clutch piston of low clutch L/C includes at least a first piston 11. The clutch piston of this embodiment is made up of the first clutch piston 11 and a second clutch piston 12. Low clutch L/C of this embodiment further includes a torque cam mechanism 13 disposed between the clutch piston and a clutch pack of clutch discs, as shown in FIG. 2.

A gear hub 15 has a rim portion and a shaft portion projecting axially (to the left as viewed in FIG. 2) from the rim portion. Gear 3c is fixed to the rim portion of gear hub 15 by bolts 14, as shown in FIG. 2. Therefore, transmission input rotation is transmitted to gear hub 15 through gear 3c. Gear 3c and gear hub 15 are rotatably mounted on a center shaft 18 through bearings 16 and 17. In this example, gear hub 15 corresponds to a first rotating member.

A clutch drum 19 has a first end portion (right side portion as viewed in FIG. 2) and a second end portion (left side portion). The first end portion (or engaging portion) of clutch drum 19 is fit over the rim portion of gear hub 15. The first end portion of clutch drum 19 is shaped like a comb, and has a plurality of teeth 19a projecting axially, and passing through rectangular holes 15a formed in gear hub 15, respectively. In this example, clutch drum 19 corresponds to a second rotating member.

Figure 3:
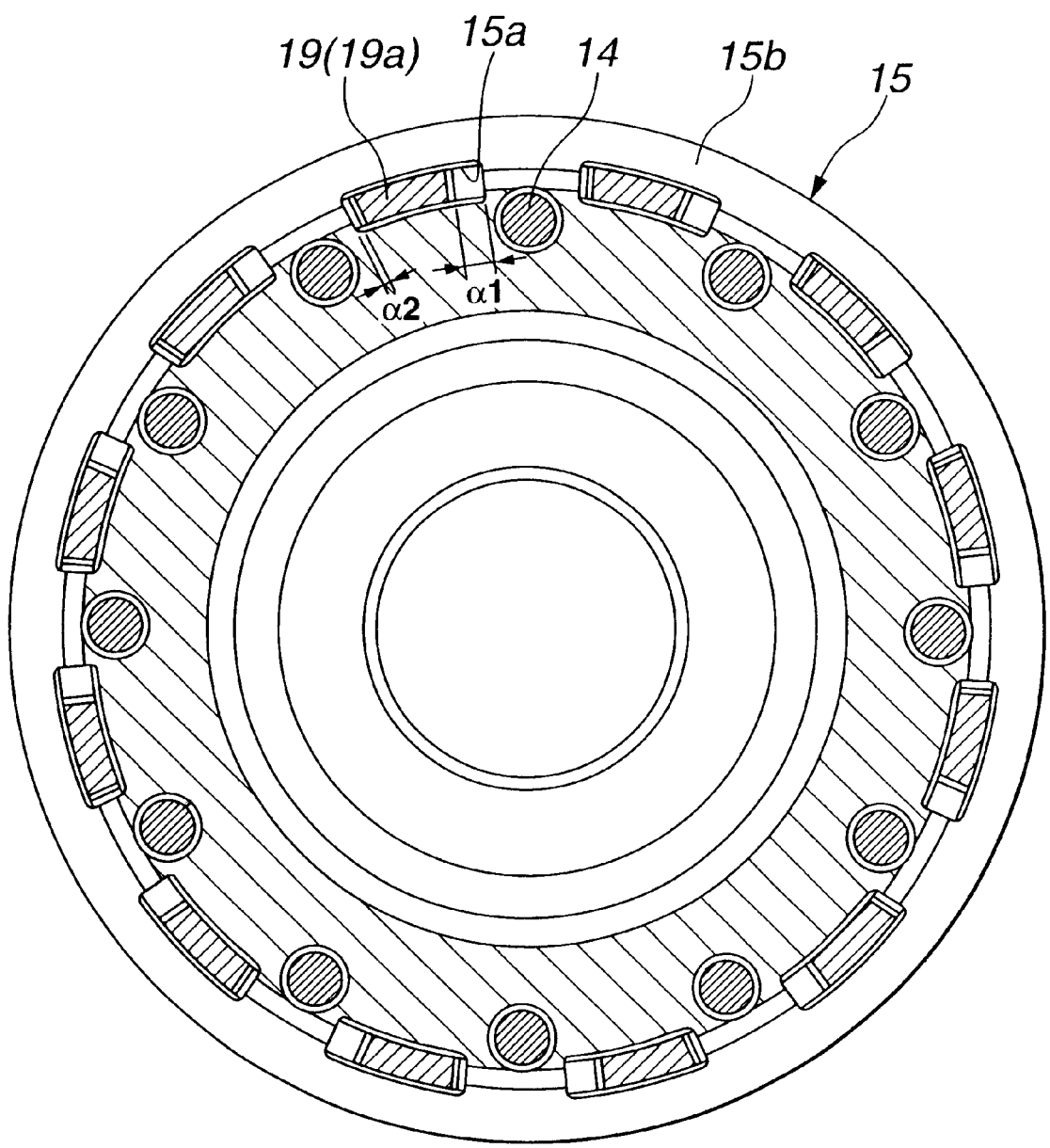
FIG. 3 is a sectional view taken across a line III—III shown in FIG. 2 as viewed from a direction shown by arrows.

Each tooth 19a of clutch drum 19 is received in the corresponding rectangular hole 15a of gear hub 15 with a circumferential clearance a1 (on a drive side) and a circumferential clearance a2 (on a coast side), as shown in FIG. 3. These circumferential clearances α1 and α2 extend circumferentially, and allow relative rotation between clutch drum 19 and gear hub 15 within limits. In the state of FIG. 3, the circumferential clearance α1 on the drive side is larger than the circumferential clearance α2 on the coast side. Teeth 19a and/or rectangular holes 15a serve as a rotation stopper.

A spacer ring 20 and a low friction ring 21 are disposed between an outward flange 15b of gear hub 15 and a snap ring 22 mounted on clutch drum 19, to prevent extraction of clutch drum 19 from gear hub 15. Outward flange 15b of gear hub 15 and snap ring 22 of clutch drum 19 clamp spacer ring 20 and low friction ring 21 therebetween, and thereby holds clutch drum 19 unextractable from gear hub 15.

A clutch hub 23 is disposed coaxially in the second (left side) portion of clutch drum 19. Clutch hub 23 extends axially into clutch drum 19 from a second end (left end as viewed in FIG. 2) of clutch drum 19. Clutch hub 23 is connected with planet carrier 2c of planetary gear set 2, as shown in FIG. 1. In this example, clutch hub 23 corresponds to a third rotating member.

External clutch discs 24 and internal clutch discs 25 are alternately arranged into a clutch disc pack. External clutch discs 24 are fit in clutch drum 19 and splined to clutch drum 19 for rotation therewith. Internal clutch discs 25 are fit over clutch hub 23 and splined to clutch hub 23 for rotation with clutch hub 23. These discs 24 and 25 serve as friction plates or elements of the clutch. The clutch pack of alternately arranged clutch discs 24 and 25 is disposed radially between clutch drum 19 (connected with gear 3c) and clutch hub 23 (connected with carrier 2c). By compressing the clutch pack axially to the left as viewed in FIG. 2, low clutch L/C is put in an engaged state to connect clutch drum 19 (gear 3c) and clutch hub 23 (carrier 2c) drivingly.

First and second pistons 11 and 12 are arranged to compress the clutch disc pack. First piston 11 is slidably fit in gear hub 15, and a first fluid chamber 26 is formed between first piston 11 and the inside wall surface of the rim portion of gear hub 15. Second piston 12 is slidably fit in first piston 11, and a second fluid chamber 27 is formed between first and second pistons 11 and 12. Second piston 12 includes a forward inner end portion 12a fit over the shaft portion of gear hub 15 through serrations so that second piston 12 rotates as a unit with gear hub 15 (gear 3c).

A snap ring 28 is attached to gear hub 15 at a position to serve as a shift stopper for limiting the stroke of first piston 11. A return spring 29 is arranged to act on second piston 12 and to urge first and second pistons 11 and 12 in a withdrawing direction (first axial direction or rightward direction in FIG. 2) away from the pack of clutch discs 24 and 25.

Second piston 12 of this example serves as a clutch piston, and as a member of the torque cam mechanism 13 with a cam plate 31 and rollers 32. Rollers 32 are disposed axially between second piston 12 and cam plate 31. In the case of relative rotation between second piston 12 and cam plate 31 in a first rotational direction (shown in FIG. 8A), produced when the IVT is in a drive performance state, rollers 32 pushes cam plate 31 in an approaching direction (toward the clutch disc pack)(second axial direction or leftward direction in FIG. 2) away from second piston 12 by the action of a cam mechanism, and thereby extends torque cam mechanism 13 axially. In the case of relative rotation between second piston 12 and cam plate 31 in a second rotational direction (shown in FIG. 8B) produced when the IVT is in a coast performance state, or in a reverse state, rollers 32 do not undergo the effect of cam mechanism, so that torque cam mechanism 13 does not extend. Cam plate 31 is engaged with clutch drum 19 so that they rotate as a unit.

Fluid chambers (or oil pressure chambers) 26 and 27 are supplied with piston actuating fluid pressures, respectively, through first and second fluid passages 33 and 34. When neither of first and second fluid chambers 26 and 27 is supplied with fluid pressure, first and second pistons 11 and 12 are put in a state (unactuated state) shown in FIG. 4 in which there is a large axial clearance β between (the cam plate 31 of) the torque cam mechanism 13 and the clutch disk pack (24 and 25). In this piston state, even if the torque cam mechanism 13 is extended to a maximum length, there remains an axial clearance between torque cam mechanism 13 and the clutch disc pack, so that low clutch L/C is held in the disengaged state.

Figure 5:
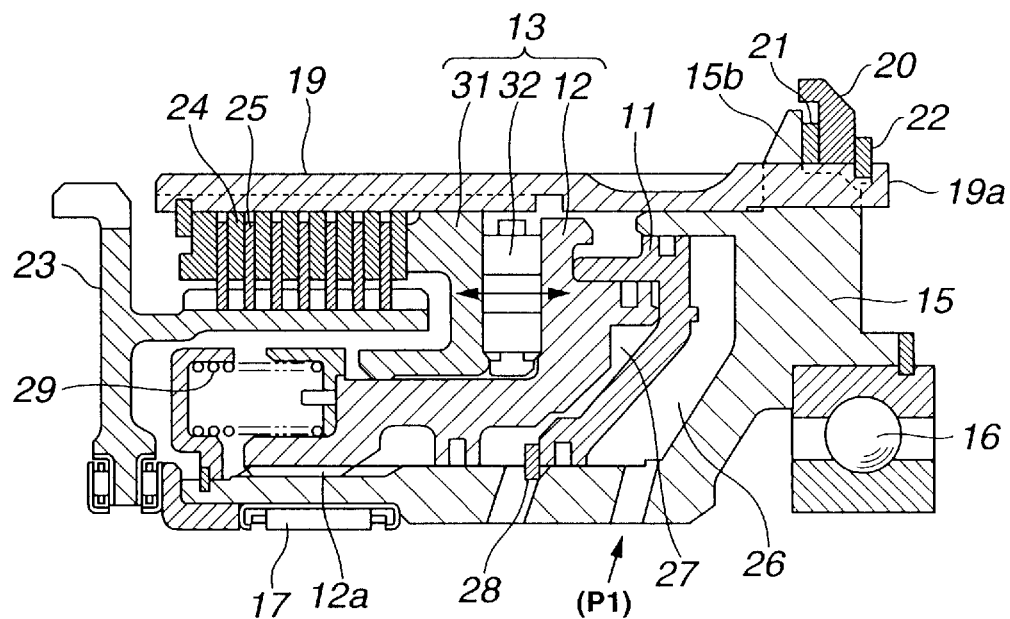
FIG. 5 is a sectional view for showing the low clutch in a one-way clutch ON state.
Figure 6:
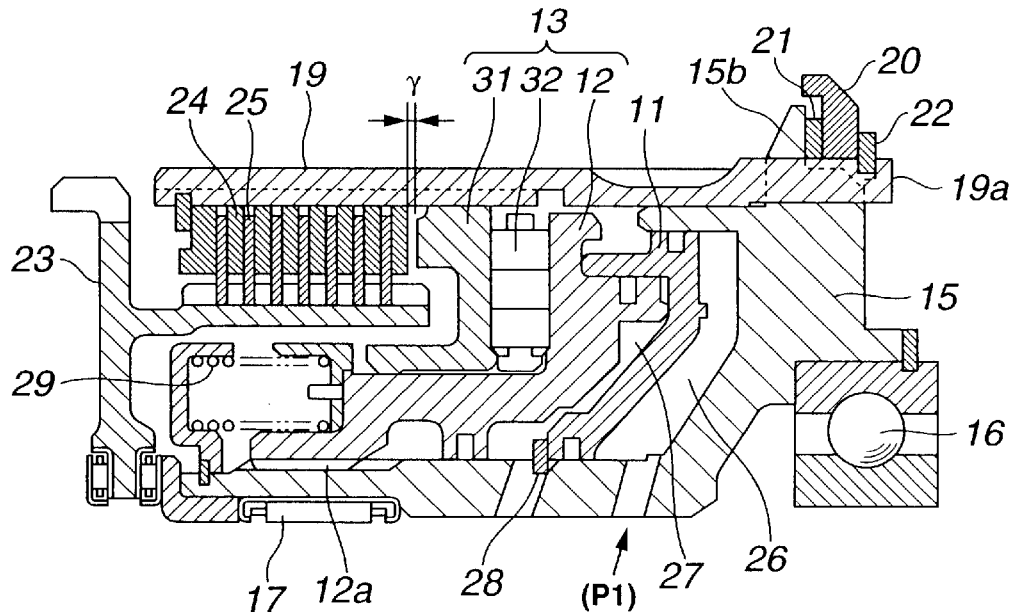
FIG. 6 is a sectional view for showing the low clutch in a one-way clutch OFF state.

When a fluid pressure P1 is supplied to first fluid chamber 26, first piston 11 moves axially together with second piston 12 until first piston 11 abuts on snap ring 28 and thereby reaches a limit position closest to the clutch disc pack (24, 25), as shown in FIG. 5 or 6. Thus, second piston 12 is moved from a first position to a second position toward the clutch pack. In this state (actuated state), there remains only a small clearance γ between torque cam mechanism 13 and the clutch disc pack even if torque cam mechanism 13 is not extended at all, as shown in FIG. 6.

If, in this piston state, a drag torque transmitted through oil between clutch discs 24 and 25 from clutch hub 23 to clutch drum 19, and applied on cam plate 31 is in the direction of the coast performance state or the reverse state, torque cam mechanism 13 remains in a non-extended state as shown in FIG. 6. Therefore, torque cam mechanism 13 maintains the axial clearance γ and thereby causes low clutch L/C to function in a one-way clutch OFF state. In the drive performance state, on the other hand, the drag torque effects the cam operation and torque cam mechanism 13 extends axially, as shown in FIG. 5, and pushes the clutch disc pack (24, 25) through cam plate 31, so that low clutch L/C functions in a one-way clutch ON state.

Figure 7:
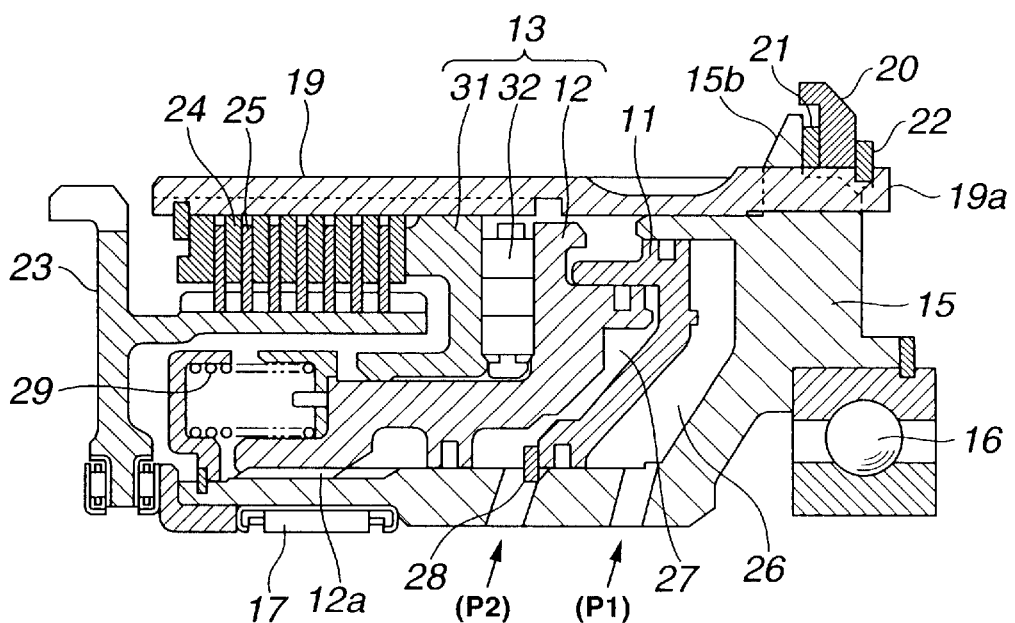
FIG. 7 is a sectional view showing the low clutch in an all-time engaged state.

When first and second fluid chambers 26 and 27 are both supplied with fluid pressure, second piston 12 as well as first piston 11 reaches its position closest to the clutch disc pack, as shown in FIG. 7. In this state (in which second piston 12 is located at a third position), second piston 12 can hold low clutch L/C always in the engaged state by compressing the clutch disc pack of discs 24 and 25 independently of the expansion of torque cam mechanism 13.

The thus-constructed infinitely variable transmission IVT is operated as follows.

In park (P) range or neutral (N) range, high clutch H/C is disengaged, and at the same time low clutch L/C is disengaged too by supplying no fluid pressure to first and second fluid chambers 26 and 27. Without the supply of fluid pressure to first and second fluid chambers 26 and 27, low clutch L/C is held in the state shown in FIG. 2 and FIG. 4, by return spring 29. Therefore, even if torque cam mechanism 13 is extended to the maximum length by the action of drag torque applied on both sides of torque cam mechanism 13 from the clutch disc pack, in the first rotational direction shown by arrows in FIG. 8A because of the IVT being in the drive performance state, there exists the axial clearance δ between torque cam mechanism 13 and the clutch disc pack, and hence low clutch L/C is held in the disengaged state.

In this case, the relative rotation between both sides of torque cam mechanism 13 is limited to the aforementioned clearance α1 shown in FIG. 3. After this limit is reached, each tooth 19a of clutch hub 19 abuts against the side wall of the corresponding rectangular hole 15a of gear hub 15 as schematically shown in FIG. 8A, and thereby prevents further relative rotation between both sides (12 and 31) of torque cam mechanism 13 beyond the state of FIG. 8A. With this limitation on the relative rotation between both sides of torque cam mechanism 13, the infinitely variable transmission of this embodiment can maintain the minimum clearance δ, and thereby avoid an unwanted situation unable to keep low clutch L/C disengaged.

Figure 4:
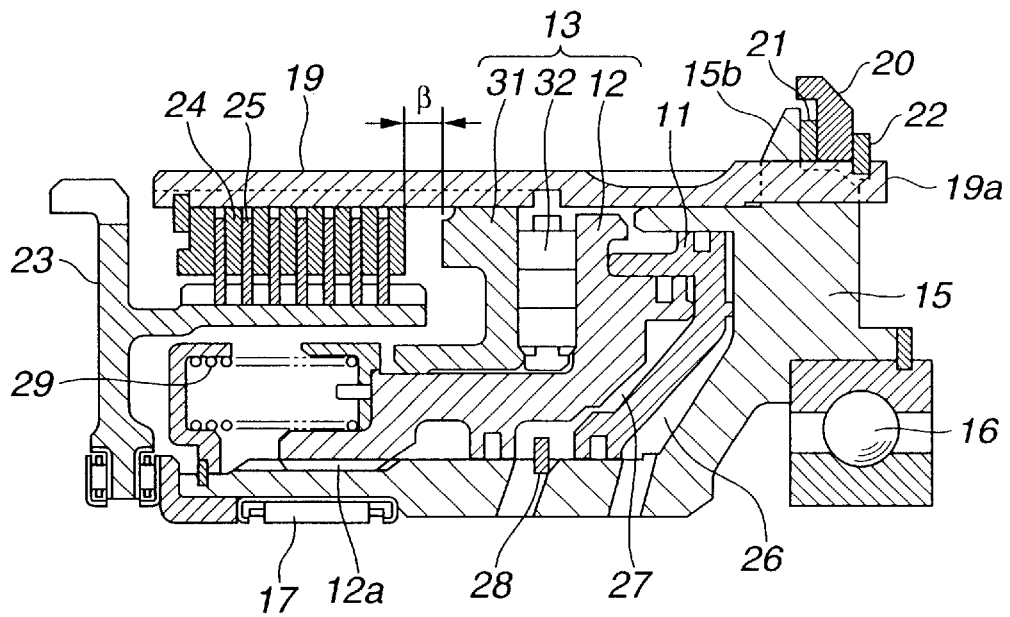
FIG. 4 is a sectional view showing the low clutch in an all-time disengaged state

When drag torque acting across torque cam mechanism 13 is in the second rotational direction shown by arrows in FIG. 8B because of the coast performance state, torque cam mechanism 13 remains unextended, leaving the large clearance β, as in the case of FIG. 4, between torque cam mechanism 13 and the clutch disc pack. Therefore, low clutch L/C is held in the disengaged state.

By thus holding high clutch H/C and low clutch L/C both in the disengaged state, as requested in P and N ranges, this infinitely variable transmission IVT can be held in the neutral state in which input rotation of input shaft 4 is not transmitted to IVT output shaft 7.

In the forward drive (D) range, first piston 11 is set at the limit stroke position at which first piston 11 abuts against snap ring 28, as shown in FIG. 5 or 6, by the continuous supply of operating fluid pressure P1 to first fluid chamber 26t of low clutch L/C. First piston 11 at the limit position holds second piston 12 at a corresponding stroke position against the force of return spring 29, as shown in FIG. 5 or 6.

In the coast performance state in D range, drag torque applied from the pack of discs 24 and 25, on torque cam mechanism 13 is in the direction shown by arrows in FIG. 9C. Therefore, torque cam mechanism 13 remains unextended, leaving a very narrow axial clearance γ between torque cam mechanism 13 and the clutch disc pack, as in the case of FIG. 6, and enables low clutch L/C to function in the one-way clutch OFF state.

In the drive performance state in D range, drag torque applied from the pack of discs 24 and 25, on torque cam mechanism 13 is in the direction shown by arrows in FIG. 9A, and hence torque cam mechanism 13 extends by the action of drag torque. As a result, torque cam mechanism 13 pushes the pack of clutch discs 24 and 25 axially, as shown in FIG. 5, and low clutch L/C can function in the one-way clutch ON state.

FIGS. 9A and 9B show two different operating modes in the drive performance state (one-way clutch ON state). In the mode of FIG. 9A, an extending force (Fex) of torque cam mechanism 13 is smaller than a pushing force (F1) produced by the oil pressure P1 (Fex<F1), and therefore, first piston 11 is held at the limit position abutting against snap ring 28. In the mode of FIG. 9B, on the other hand, the extending force (Fex) of torque cam mechanism 13 is greater than the pushing force of oil pressure P1 (Fex>F1). In this case, after the abutting between the teeth 19a and the sides of rectangular holes 15a, first piston 11 is pushed back in a direction away from snap ring 28, as shown at ε in FIG. 9B. Low clutch L/C can still function in the one-way clutch ON state.

When engine braking effect is needed in D range, or R range is selected to move the vehicle backward, oil pressures P1 and P2 are supplied, respectively, to first and second fluid chambers 26 and 27 of low clutch L/C. Therefore, first piston 11 is moved to the limit position abutting against snap ring 29, as shown in FIG. 7, and second piston 12 is moved further beyond the position shown in FIG. 5 or 6, up to the position at which second piston 12 pushes the pack of clutch discs 24 and 25 axially through torque cam mechanism 13 even if torque cam mechanism 13 is not extended at all.

Figure 10A:
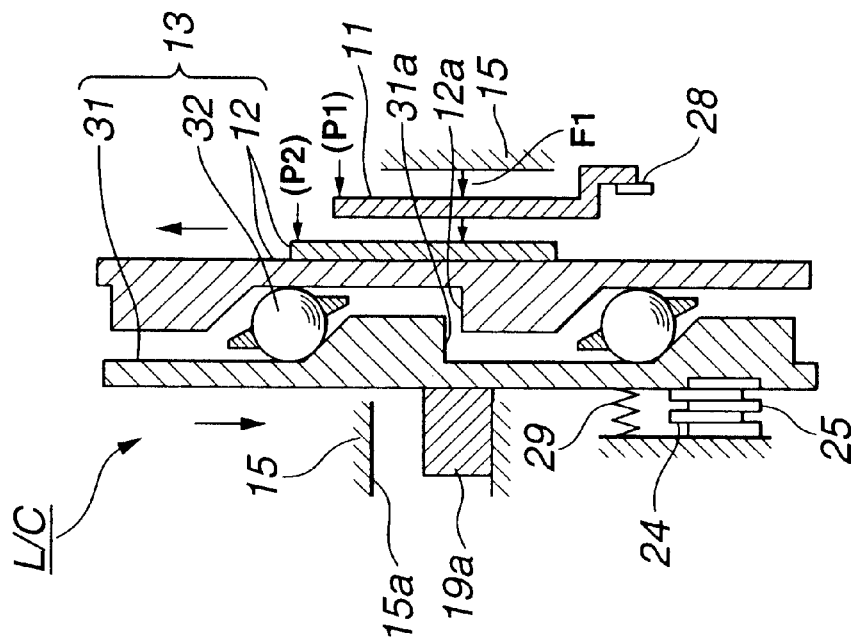
FIGS. 10A and 10B are sectional views of the torque cam mechanism in the low clutch in the all-time engagement state.
Figure 10B:
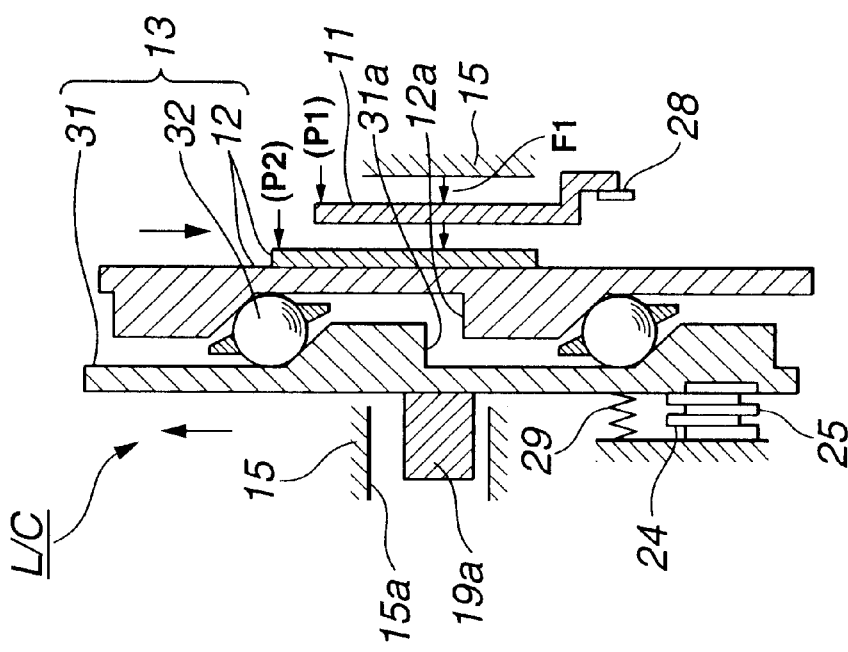

In this case, this transmission system can hold low clutch L/C in a two-way (all-time) engagement state in both directions without the need for extension of torque cam mechanism 13 both when the torque applied on torque cam mechanism 13 from the pack of discs 24 and 25 is in the direction shown by arrows in FIG. 10A in drive performance in D range, and when the torque is in the opposite direction shown in FIG. 10B in coast operation (engine braking) in D range or in reverse operation in R range In the case of coast operation (engine braking) in D range and the case of reverse operation in R range, torque cam mechanism 13 has to transmit torque in the one-way clutch OFF direction as shown by arrows in FIG. 10B. To achieve this power transmission, there are provided, in this example, two abutting setups. First, this power transmission is implemented by the abutment between teeth 19a and rectangular holes 15a at an angular position reached after an angular displacement of α2 shown in FIG. 3. Second, there are formed, respectively, in second piston 12 and cam plate 31, stopper steps 12a and 31a for abutting each other, as shown in FIG. 10B. It is possible to achieve this power transmission only with the first abutting setup between teeth 19a and rectangular holes 15a. In this example, however, there is further provided the second abutting setup of stopper steps 12a and 31a for double assurance.

The thus-constructed infinitely variable transmission IVT transmits power in the following manner. In D range, first and second pistons 11 and 12 are put in stroke positions shown in FIG. 5 or FIG. 6 by supplying operating fluid pressure P1 to first fluid chamber 26 of low clutch L/C. If high clutch H/C is not engaged, transmission input rotation is transmitted from input shaft 4, through invariable transmission 3 and low clutch L/C, to planet carrier 2c of planetary gear set 2. This power flow is a normal power flow in the drive state. Therefore, torque cam mechanism 13 extends by the action of cam mechanism as shown in FIG. 5 and FIGS. 9A and 9B, until clutch discs 24 and 25 are compressed axially. Thus, low clutch 13 can achieve this power transmission in the one-way clutch ON state.

The rotation thus transmitted to carrier 2c is distributed between sun gear 2s and ring gear 2r. The rotation allotted to sun gear 2s is circulated by gears 6b and 6a through CVT 1 to input shaft 4. The power circulated in this way is taken out from ring gear 2r to output shaft 7. This mode of operation is referred to as power recirculation mode.

In the power recirculation mode, as shown in FIG. 12, this transmission system can set a CVT transmission ratio icvt of CVT 1, to such a ratio value icgnp as to make the speed of rotation to ring gear 2r equal to zero, to reduce the output rotational speed Nout of infinitely variable transmission IVT to zero (geared neutral point GNP), and thereby bring about an infinite ratio state (vehicle stopping state) in which an inverse IVT speed ratio ET (transmission output speed Nout/transmission input speed Nin, or the inverse of IVT input/output speed ratio) is equal to zero (IVT input/output speed ratio Nin/Nout is infinite), without disconnecting the mechanical driving connection.

As CVT speed ratio icvt is varied on a lower speed side of the zero output speed ratio value icgnp in power circulation mode, the output speed Nout of infinitely variable transmission IVT is increased in the forward rotational direction, and the infinitely variable transmission IVT enables the forward operation.

When the CVT speed ratio icvt of CVT 1 reaches a ratio value of icrsp on the lower speed side, then the rotational speeds of sun gear 2s and ring gear 2r (the speeds of the drive side member and driven side member of high clutch H/C) becomes equal to each other (as shown at a rotation synchronous point RSP in FIG. 12). By engaging high clutch H/C at this point, this transmission system can change over the operating mode from power recirculation mode to a direct (connection) mode with no shock at least in theory.

In direct mode, the output rotation of CVT 1 is transmitted through the set of gears 6a and 6b and high clutch H/C, to output shaft 7, so that the output rotation from CVT 1 can be taken out directly from output shaft 7.

In direct mode, the rotational speed of clutch hub 23 rotating with carrier 2c becomes faster than the speed of clutch drum 19, and torque cam mechanism 13 causes low clutch L/C to function in one-way clutch OFF state as shown in FIG. 9C. Therefore, this transmission system can achieve a mode change from power recirculation mode to direct mode merely by engaging high clutch H/C without removing operating fluid pressure P1 for first piston 11.

In the case of a mode change from direct mode to power circulation mode, it is theoretically possible to achieve the mode change merely by disengaging high clutch H/C at the rotation synchronous point RSP without shock theoretically.

From output shaft 7, rotation is further transmitted through the set of gears 8~10, to drive wheels to drive the vehicle.

When a coast operation starts during the forward drive (D range) in the power recirculation mode, then torque cam mechanism 13 causes low clutch L/C to function in one-way clutch OFF state, as shown in FIG. 9C. This can eliminate an unwanted feeling of deceleration. However, engine braking is unobtainable. When engine braking is required in such a coast state as in a downhill, second piston 12 is further moved forward from the position determined by first piston 11 shown in FIG. 5 or 6, to the position shown in FIG. 7, by supplying a fluid pressure P2 to second fluid chamber 27 in addition to the supply of fluid pressure to first chamber 26. Thus, the transmission system can bring low clutch L/C into the (two-way) all time engaged state in both directions, and renders the effect of engine braking obtainable, despite the interposition of torque cam mechanism 13, by compressing the pack of clutch discs 24 and 25 axially through torque cam mechanism 13, without resorting to the extension of torque cam mechanism 13.

Torque cam mechanism 13 receives relative rotation in the one-way clutch OFF direction as shown in FIG. 10B because of the power flow being in the coast state. This relative rotation is limited by the abutment between teeth 19a and rectangular holes 15a and the abutment between stopper steps 12a and 31a. Therefore, torque cam mechanism 13 does not hamper the two-way engagement state of low clutch L/C, and ensures the engine braking effect.

In R range, by disengaging high clutch H/C and supplying fluid pressure to both of first and second fluid chambers 26 and 27 of low clutch L/C, the transmission system moves first and second pistons 11 and 12, to the positions shown in FIG. 7, and achieves the power recirculation mode by putting low clutch L/C in the two-way engagement state as shown in FIGS. 10A and 10B.

By shifting the CVT speed ratio on the higher speed side beyond the neutral point ratio value icgnp corresponding to geared neutral point GNP shown in FIG. 12, this transmission system produces output rotation (Nout) in opposite direction for backward vehicle movement.

In this way, the infinitely variable transmission IVT according to this embodiment can effect an operation mode change between the power recirculation mode and the direct connection mode merely by controlling high clutch H/C between the engaged state and disengaged state while holding first piston 11 of low clutch L/C at the limit position by the supply of fluid pressure to first fluid chamber 26 as mentioned before. The control of the mode change between the power recirculation mode and direct mode is easy.

Moreover, the infinitely variable transmission IVT according to this embodiment can bring the low clutch L/C reliably to the disengaged state when the vehicle is stopped from the drive state and then P or N range is selected. In P or N range, low clutch L/C is put in the state shown in FIG. 4 with the first and second fluid chambers 26 and 27 both in drained state. Therefore, the IVT can ensure the axial clearance δ between torque cam mechanism 13 and clutch pack of discs 24 and 25, and thereby hold the low clutch L/C reliably in the all-time disengaged state even if torque cam mechanism 13 is extended to the maximum extent by drag torque as shown in FIG. 8A. This transmission system can return the low clutch L/C to the disengaged state without waiting for drag torque in a direction to contract torque cam mechanism 13.

Figure 11:
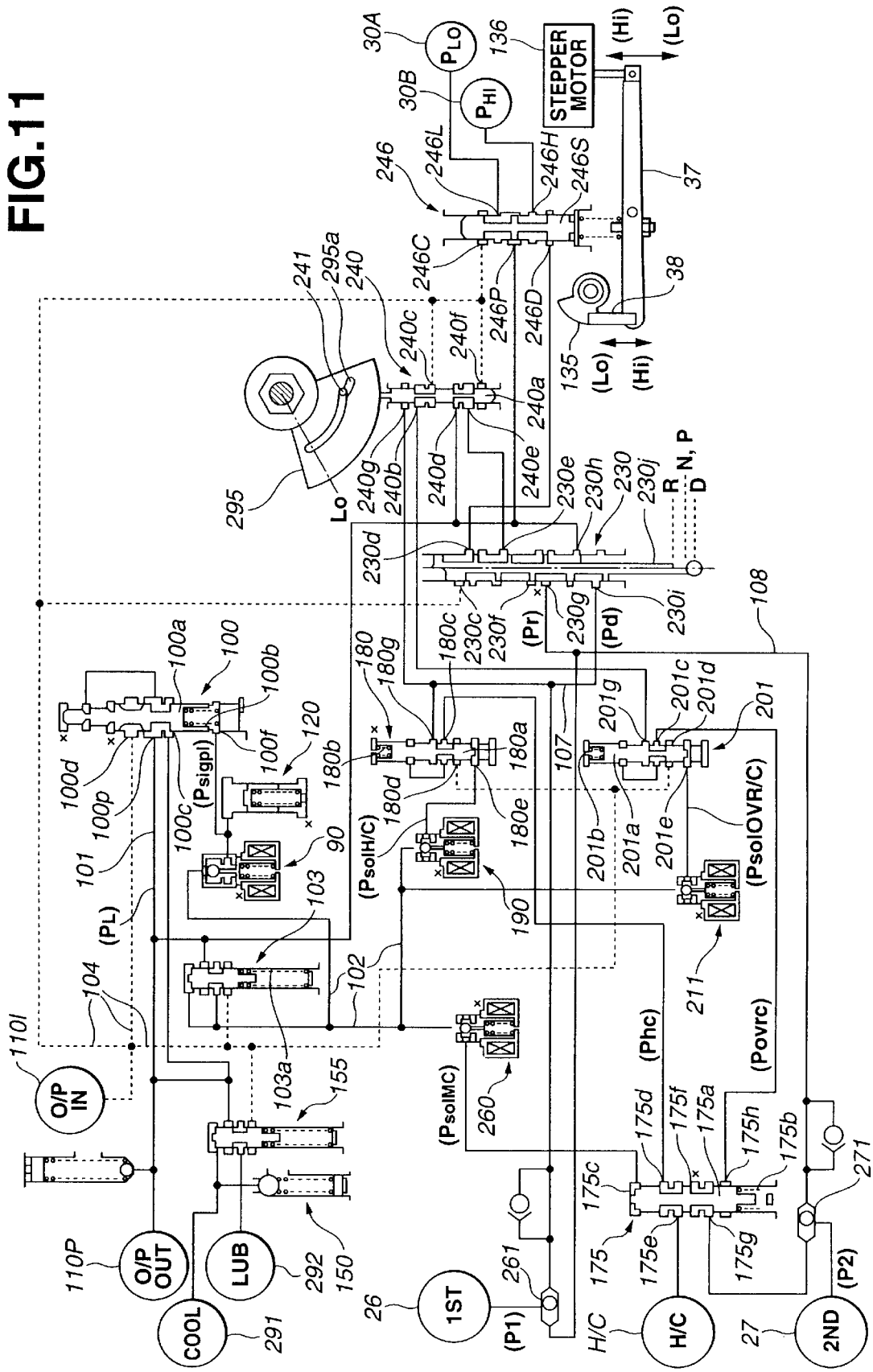
FIG. 11 is a schematic view of a shift control hydraulic circuit employed in the transmission system shown in FIG. 1.

FIG. 11 shows a shift control circuit for the infinitely variable transmission IVT.

Line pressure and lubrication pressure control system is arranged as follows. An oil pump discharge port 110p is connected through a line pressure circuit 101 to a line pressure port 100p of a pressure regulator valve 100. A signal pressure Psigp1 is delivered from a line pressure solenoid valve 90, to a port 100f of pressure regulator valve 100. In pressure regulator valve 100, a spool 100a slides so as to keep a balance between a resultant force of a force due to signal pressure Psigp1 and an urging force of a spring 100b, and a force due to a feedback fluid pressure from line pressure port 110p, and thereby control a line pressure PL in line pressure circuit 101 connected with line pressure port 100p, to a predetermined value corresponding to signal pressure Psigp1 of line pressure solenoid valve 90.

Line pressure solenoid valve 90 uses, as a source pressure, a constant pilot pressure Pp from a pilot pressure circuit 102, and regulates the signal pressure Psigp1 in response to an electronic control signal. The pilot pressure is a constant pressure corresponding to a spring force of a spring 103a, produced by a pilot valve 103 by using, as a source pressure, line pressure PL of circuit 101. An accumulator 120 is interposed between line pressure solenoid valve 90 and port 100f.

An oil pump intake port 110i is connected to a pump intake fluid passage 104. When line pressure PL increases beyond a predetermined level, pressure regulator valve 100 connects a second drain port 100d connected with pump intake passage 104, with line pressure port 100p, and thereby restrains an increase of line pressure PL beyond the predetermined level.

A first drain port 100e of pressure regulator valve 100 is used as a supply pressure of a cooler reducing valve 155. A control pressure of cooler reducing valve 155 is connected with a cooler port 291. Cooler reducing valve 155 is arranged to prevent cooler supply pressure from increasing beyond a predetermined level, and protect a cooler piping system. In order to prevent a cooler system pressure from increasing to an abnormal level in case of stick in cooler reducing valve 155, there is provided a more quickly operable cooler relief valve 150 connected with the control pressure of cooler reducing valve 155. The control pressure of cooler reducing valve 155 is connected to cooler port 291, and to a lubrication port 292 through an orifice. The oil is supplied therefrom to various portions in the IVT for lubrication and cooling.

Line pressure circuit 101 regulated by pressure regulator valve 100 is connected with a manual valve 230 arranged to move in response to a driver's shift lever, a reverse torque shutoff valve 240 arranged to move in response to a trunnion tilt angle of toroidal CVT 1, and a shift control valve 246 arranged to move in response to a stepper motor (shift actuator) 136 and a precision cam 135 through a shift link 37.

Stepper motor 136 of this example moves shift link 37 in a direction to decrease the CVT input/output speed ratio icvt (to Hi side) by decreasing the number of steps and in a direction to increase the CVT input/output speed ratio icvt (to Lo side) by increasing the number of steps. A cam surface of precision cam 135 is contoured in the following manner. When precision cam 135 rotates in the direction to increase CVT input/output speed ratio icvt (to Lo side), then a feedback link 38 rotates shift link 37 in the clockwise direction in FIG. 11. When precision cam 135 rotates in the direction to decrease CVT input/output speed ratio icvt (to Hi side), then feedback link 38 rotates shift link 37 in the counterclockwise direction in FIG. 11.

Shift control valve 246 includes a supply port 246P connected with line pressure circuit 101; a Lo side port 246L connected with a cylinder oil chamber 30A for shifting down toroidal CVT 1; and a Hi side port 246H connected with a cylinder oil chamber 30B for shifting up toroidal CVT 1. In accordance with the position of a movable spool 246S connected with shift link 37, the line pressure PL is supplied to one of Lo side port 246L and Hi side port 246H, and the other port (246L or 246H) is connected to a corresponding one of drain ports 246C and 246D. Drain port 246C connectable with Lo side port 246L is connected with pump intake passage 104 and a port 240f of reverse torque shutoff valve 240. Drain port 246D for Hi side port 246H is connected with a port 230d of manual valve 230.

Spool 230j of manual valve 230 of this example is driven by a cam member rotated in accordance with the select lever operated by the driver. Spool 230j is set at one of a D range position for forward vehicle movement, a R range position for reverse vehicle movement, and an N/P range position for stopping and parking. When D range is selected, spool 230j is set at the D range position lowest as viewed in FIG. 11. In R range, spool 230j is held at the uppermost R range position. In N or P range, spool 230j is at the N/P range position which is intermediate between the D range position and the R range position.

When the forward range such as D range is selected, spool 230j moves upward in FIG. 11 and connects a line pressure port 230h communicating with line pressure circuit 101, with a D range pressure port 230i to supply line pressure PL, to a D range pressure circuit 107. In this state, D range pressure circuit 107 supplies line pressure PL to a high clutch control valv3e 180 and the first fluid pressure chamber 26. Line pressure PL is supplied to first fluid pressure chamber 26 through a shuttle valve 261. Moreover, D range pressure circuit 107 supplies line pressure PL to a port 240g of reverse torque shutoff valve 240 responsive to trunnion tilt angle.

When the trunnion tilt angle becomes smaller than a predetermined angle, a spool 240a in reverse torque shutoff valve 240 shifts upward in FIG. 11 to connect the port 240g with a port 240b, and supplies line pressure PL from D range pressure circuit 107 to a second fluid pressure chamber control valve 201 to allow engagement of second piston 12 by the fluid pressure in second fluid pressure chamber 27 and to enable the engine braking during forward driving in D range.

In D range, an R range pressure port 230g of manual valve 230 connected with R range pressure circuit 108 is connected with a drain port 230f, and the supply of fluid pressure is shut off, to second fluid pressure chamber 27 connected with R range pressure circuit 108 through a shuttle valve 271. In D range, moreover, manual valve 230 connects a port 230d connected with a drain side port 246D of shift control valve 246, to pump intake passage 104 through a port 230c. In D range, manual valve 230 shuts off its port 230e connected with port 240e of reverse torque shutoff valve 240.

When stoppage range such as N range or P range is selected, spool 230j moves to a position located approximately at the middle of the entire stroke, and renders the first piston 11, high clutch H/C, and second piston 12 all inoperative to shut off the torque transmission between transmission input shaft 4 and transmission output shaft 7, by shutting off line pressure port 230h, opening D range pressure port 230i to the atmosphere to allow drainage from the under side in FIG. 11, connecting R range pressure port 230g with drain port 230f for drainage in both of D range pressure circuit 107 and R range pressure circuit 108 and shutting off the supply of line pressure PL to high clutch control valve 180, second fluid pressure chamber control valve 201 and first fluid pressure chamber 26.

When reverse range such as R range is selected, spool 230j moves upward in manual valve 230. By so doing, spool 230*j* connects R range pressure port 230*g* with line pressure port 230*h*, and opens the D range pressure port 230*i* to the atmosphere to allow drainage from the under side in FIG. 11. As a result, line pressure PL is applied from R range pressure port 230*g* to R range pressure circuit 108, a valve element in shuttle valve 271 moves leftward in FIG. 11, and second piston 12 is actuated by the pressure in fluid pressure chamber 27. R range pressure circuit 108 is further connected through shuttle valve 261 to first fluid pressure chamber 26. Line pressure PL delivered from R range pressure port 230*g* to R range pressure circuit 108 causes the valve element of shuttle valve 261 to move rightward in FIG. 11, and the operating fluid pressure supplied to fluid pressure chamber 26 actuates first piston 11, too.

The fluid pressure in D range pressure circuit 107 is drained through port 230*i*, and first piston 11 is held in un-actuated state by the drain of fluid pressure chamber 26. High clutch H/C is disengaged by shutoff of source pressures of high clutch control valve 180 and second fluid pressure chamber control valve 201. Port 230*d* connected with drain side port 246D of shift control valve 246 is connected through port 230*e* to a port 240*e* of reverse torque shutoff valve 240, so that fluid pressure cylinder chamber 30B is connectable with port 240*e* of reverse torque shutoff valve 240.

A pilot pressure circuit 102 regulated by a pilot valve 103 is arranged to supply a pilot pressure Pp as control original pressure to a high clutch solenoid unit 190 for controlling high clutch H/C, a second fluid pressure chamber control solenoid unit 211 for controlling second fluid pressure chamber 27 and a mode changeover solenoid unit 260 for controlling a mode changeover valve 175, respectively. High clutch solenoid unit 190, second chamber control solenoid unit 211 and mode changeover solenoid unit 260 are controlled in the manner of duty ratio control, respectively, by an electronic control unit or controller.

A signal pressure PsolH/C regulated by high clutch solenoid unit 190 is supplied to port 180*e* of high clutch control valve 180. A signal pressure PsoIOVR/C regulated by second pressure chamber solenoid unit 211 is supplied to a port 201*e* of second pressure chamber control valve 201. In response to signal pressure PsolH/C supplied to port 180*e*, a spool 180*a* moves in high clutch control valve 180, which reduces D range pressure Pd (line pressure PL) supplied from D range pressure circuit 107 to a port 180*g*, and supplies the reduced pressure as a control pressure Phc from an output port 180*c* to mode changeover valve 175. A port 180*d* is connected with pump intake passage 104. Signal pressure PsolH/C urges spool 180*a* against spring 180*b* and D range pressure Pd. As signal pressure PsolH/C increases, control pressure Phc is increased. When signal pressure PsolH/C is equal to zero, high clutch control valve 180 connects port 180*c* with port 180*d* and drains the control pressure Phc.

Similarly, second pressure chamber control valve 201 moves a spool 201*a* in accordance with signal pressure PsoIOVR/C supplied to a port 201*e*, reduces Rrange pressure Pr (line pressure PL) supplied from R range pressure circuit 108 to a port 201*g*, and supplies the reduced pressure as a control pressure Povrc from an output port 201*c* to mode changeover valve 175. A port 201*d* is connected with pump intake passage 104. Signal pressure PsoIOVR/C urges spool 201*a* against spring 201*b* and R range pressure Pr. As signal pressure PsoIOVR/C increases, control pressure Povrc is increased. When signal pressure PsoIOVR/C is equal to zero, second pressure chamber control valve 201 connects output port 201*c* with port 201*d* with the force of spring 201*b* and drains the control pressure Povrc to pump intake passage 104.

Mode changeover valve 175 receives a control pressure Phc from high clutch control valve 180 and a control pressure Povrc from second pressure chamber control valve 201, and moves a spool 175*a* in accordance with a signal pressure PsoIMC supplied from mode changeover solenoid unit 260. In accordance with the stroke position of spool 175*a*, mode changeover valve 175 functions to supply control pressure Phc to high clutch H/C or instead to direct control pressure Povrc to second pressure chamber 27. To this end, output port 180*c* of high clutch control valve 180 and output port 201*c* of second pressure chamber control valve 201*c* are connected, respectively, with ports 175*d* and 175*h* of mode changeover valve 175. Port 175*e* of mode changeover valve 175 is connected with high clutch H/C. Port 175*g* is connected through shuttle valve 271 with second pressure chamber 27. A port 175*f* formed between these ports 175*e* and 175*g* is a drain port.

In response to the displacement of spool 175*a*, mode changeover valve 175 is brought to a state in which control pressure Phc is supplied to high clutch H/C and second pressure chamber 27 is drained through port 175*f*, or to another state in which control pressure Povrc is supplied to second pressure chamber 27 and high clutch H/C is drained through port 175*f*. At an end portion of spool 175*a*, there is formed an oil chamber 175*c* which receives signal pressure PsoIMC from mode changeover solenoid unit 260, and enables the above-mention mode change operations by pushing spool 175*a* with signal pressure PsoIMC, against spring 175*b*. When signal pressure PsoIMC is zero, spool 175*a* is pushed upward in FIG. 11 by spring 175*b* to a position connecting port 175*d* with port 175*e* to supply control pressure Phc to high clutch H/C. On the other hand, spool 175*a* connects ports 175*g* and 175*f* to drain the pressure to shuttle valve 271.port 175*g* with port 175*h*. When signal pressure PsoIMC increases to a maximum level, spool 175*a* moves downward in FIG. 11 by pushing spring 175*b*. Thus, mode changeover valve 175 actuates second piston 12 by supplying control pressure Povrc through shuttle valve 271 to second pressure chamber 27, and disengages high clutch H/C by connecting ports 175*e* and 175*f* for drainage.

Reverse torque shutoff valve 240 is connected with manual valve 230 and shift control valve 246. A spool 240*a* of reverse torque shutoff valve 240 is provided with a pin 241 engaged in a cam groove 295*a* of a cam 295 connected with trunnion, and arranged to move in accordance with the tilt angle of power roller rotatably supported by the trunnion. In accordance with the position of spool 240*a*, reverse torque shutoff valve 240 connects a port 240*e* communicating with port 230*e* of manual valve 230, to one of line pressure port 240*d* communicating with line pressure circuit 101, and port 240*f* communicating with pump intake passage 104 and drain port 246C of shift control valve 246, and connects port 240*b* communicating with second pressure chamber control valve 201, to one of port 240*g* communicating with D range pressure circuit 107 and port 240*c* communicating with pump intake passage 104.

At one end of spool 240*a* of reverse torque shutoff valve 240, there is formed pin 241 received in cam groove 295*a*. Cam 295 rotates in counterclockwise direction in FIG. 11 by the action of trunnion when CVT speed ratio icvt is increased (to Lo side), and rotates in clockwise direction when CVT speed ratio icvt is decreased (to Hi side).

Cam groove 295*a* formed in cam 295 is designed to produce stroke of spool 240*a* in an angular range between a tilt angle $\phi$r greater than $\phi$gnp corresponding to geared neutral point GNP shown in FIG. 12, and a tilt angle $\phi$d smaller than $\phi$gnp, and to hold spool 240*a* stationary in a range smaller than tilt angle φd and a range greater than φr. At a tilt angle φgnp corresponding to geared neutral point GNP (shown as CVT speed ratio icgnp in FIG. 12), spool 240a is located, by cam groove 295a, about the middle of the stroke, as shown in FIG. 11. In this state, ports 240b and 240c are connected together, so that port 201g of second chamber control valve 201 is connected with pump intake passage 104, and line pressure port 240d communicates with port 240e, so that line pressure PL is supplied to port 230e of manual valve 230.

When CVT speed ratio icvt is increased (to Lo side) from geared neutral point GNP, the power roller tilt angle decreases from φgnp toward φd, and cam 295 rotates in counterclockwise direction as viewed in FIG. 11. In this case, cam groove 295a performs such a function of cam mechanism as to move spool 240a upward in FIG. 11. When the power roller tilt angle is varied from φgnp to φd in the direction to increase CVT speed ratio icvt, spool 240a is moved to a corresponding position. At a power roller tilt angle of φd, port 240b is shut off while port 240e is held in communication with line pressure port 240d. When the power roller tilt angle becomes smaller than φd, then port 240b is connected with port 240g and port 201g of second chamber control valve 201 is connected to D range pressure circuit 107. When CVT speed ratio icvt is further increased, spool 240a moves further upward, and held at a position maintaining sealing of port 240b and port 240c. Thereafter, spool 240a remains at that position without moving upward beyond that position and prevents the length of reverse torque shutoff valve 240 from being increased even though the tilt angle is varied to a minimum value φ10 (corresponding to CVT speed ratio iclo shown in FIG. 12) used in the control.

When CVT speed ratio icvt is decreased from neutral point GNP (to Hi side), power roller tilt angle is increased from φgnp toward φd, and cam 295 rotates in clockwise direction in FIG. 11. In this case, cam groove 295a performs such a function of cam mechanism as to move spool 240a downward in FIG. 11. When the power roller tilt angle is varied from φgnp to φr in the direction to decrease CVT speed ratio icvt, spool 240a is moved to a corresponding position. At a power roller tilt angle of φr, port 240e is shut off from line pressure port 240d while ports 240b and 240c are held in communication with each other. When the power roller tilt angle becomes greater than φr, then port 240e is connected with port 240f and port 230e of manual valve 230 is connected with pump intake circuit 104. When CVT speed ratio icvt is further decreased, spool 240a moves further downward, and held at a position maintaining sealing of port 240d and port 240e. Thereafter, spool 240a remains at that position without moving downward beyond that position and prevents the length of reverse torque shutoff valve 240 from being increased even though the tilt angle is varied to a maximum value φhi (corresponding to CVT speed ratio ichi shown in FIG. 12) used in the control.

The thus-constructed transmission system is operated as follows.

<N-D Select and Forward Drive in Power Recirculation Mode>

In the case of changeover from P or N range to D range, manual valve 230 supplies D range pressure (line pressure PL) to D range pressure circuit 107, so that first piston 11 is moved to the limit position by the supply of fluid pressure to first chamber 26, and the transmission system can transmit torque in the power recirculation mode. With the actuation of first piston 11, low clutch L/C can transmit driving force in the one-way clutch ON state, in which low clutch L/C can transmit torque on the drive side in power recirculation mode, but low clutch L/C cannot transmit torque on the coast side, so that engine brake is unobtainable.

In the state in which an accelerator pedal is released, stepper motor is advanced in the forward direction (the direction to increase CVT speed ratio) to obtain a preset creep torque, as disclosed in Japanese Published Patent Application No. H10-267117.

When the accelerator pedal is depressed, the transmission system performs the normal CVT speed ratio control so as to achieve a predetermined input shaft rotational speed with respect to vehicle speed, in the following manner.

First, on the basis of a preset shift map, the transmission system determines a target input shaft rotational speed from the accelerator pedal depression degree and vehicle speed, further determines a target IVT inverse (output/input) speed ratio {(which is the inverse of a target IVT (input/output) speed ratio}, and determines a target CVT (input/output) speed ratio from the target IVT inverse ratio by using a map corresponding to FIG. 12. In accordance with a deviation of the actual CVT (input/output) speed ratio from the target CVT (input/output) speed ratio, the transmission system controls the stepper motor 136 in a manner of feedback control to reduce the deviation.

In forward travel in power recirculation mode in D range, mode changeover solenoid unit 260 is energized to produce signal pressure PsoIMC and to move spool 175a in mode changeover valve 175 to a lower position to keep connection between port 175e and drain port 175f to prevent engagement of high clutch H/C. When engine braking is desired on a downgrade, the transmission system produces control pressure Povrc by energizing second chamber solenoid unit 211 and produces signal pressure PsoIMC by energizing mode changeover solenoid 260 if the vehicle speed is equal to or higher than a predetermined level (of about 10 km/h). Therefore, spool 175a is pushed downward in mode changeover valve 175, and control pressure Povrc is supplied through port 175h, port 175g and shuttle valve 271 to second fluid chamber 27 to actuate second piston 12 too. Consequently, low clutch L/C is held engaged in the state shown in FIG. 7 and FIG. 10B, to inhibit the one-way clutch OFF state and to effect engine brake.

It is possible to drain second fluid chamber 27 to bring second piston 12 to the unactuated state only by deenergizing mode changeover solenoid unit 260. When signal pressure PsoIMC is reduced to zero by the deenergization, spool 175a is pushed upward by spring 175b to the position connecting port 175g with port 175f to drain second fluid chamber 27. A decision on the drainage of second fluid chamber 27 may be made when the vehicle speed becomes equal to or lower than the predetermined level or when the IVT inverse ratio Et (output/input) becomes equal to a ratio corresponding a first speed in a multi-speed automatic transmission, or a ratio corresponding to a lowermost ratio (on the Lo side) in a continuously variable transmission equipped with a torque converter. By controlling the drainage of second fluid chamber 27, the transmission system can prevent useless engine braking in a low vehicle speed region.

Port 201g for supplying a source pressure to second chamber control valve 201 is connected with port 240b of reverse torque shutoff valve 240, and designed to receive D range pressure Pd from port 240g selectively in accordance with the position of spool 240a. Therefore, if the power roller tilt angle φ is greater than φd (the CVT input/output speed ratio icvt is on the Hi side of icd shown in FIG. 12), port 240b is drained through port 240c to pump intake passage 104, to prevent the rise of control pressure Povrc, and hence second fluid chamber 27 is held in the non-pressure state to prevent torque transmission on the engine braking side.

<Operating Mode Changeover from Power Recirculation Mode to Direct Mode>

In a changeover from the power recirculation mode to direct mode, if second piston 12 is in the actuated state, the transmission system brings second piston 12 to the unactuated state promptly by deenergizing second chamber solenoid unit 211. With no delay or a slight delay with respect to the changeover of second piston to the unactuated state, the transmission system starts the supply of control pressure Phc by energizing high clutch solenoid unit 190, and thereby engages high clutch H/C. In this case, spool 175a moves upward in FIG. 11 in mode changeover valve 175 because of deenergization to mode changeover solenoid unit 260 at the time of operation to bring the second piston to the unactuated state. Therefore, mode changeover valve 175 holds second fluid chamber 27 in the non-pressure state without regard to control pressure Povrc, and allows the engagement of high clutch H/C.

On the other hand, first piston 11 is held at the limit position by the supply of pressure to first fluid chamber 26 owing to the selection of D range, so that torque on the drive side in the forward direction in power recirculation mode can be transmitted continuously during transition of the operation mode by the low clutch L/C in one-way clutch ON state.

When high clutch solenoid unit 190 is constructed as a normally closed type, it is possible to increase control pressure Phc from high clutch control valve 180 gradually for engagement of high clutch H/C by gradually increasing an ON duty ratio for the control of this solenoid. When control pressure Phc is increased to a value needed to engage high clutch H/C, the operating mode is changed from power recirculation mode to direct mode.

In this way, the transmission system according to this embodiment can carry out a mode change between the power recirculation mode and direct mode readily and quickly by controlling the engagement/disengagement state of high clutch H/C only while first piston 11 is set at the actuated state by the supply of pressure to first chamber 26. The control of operation mode changeover can be significantly simplified.

<Direct Mode>

In the direct (connection) mode in which high clutch H/C is engaged, low clutch L/C acts to transmit torque in the one-way clutch OFF state. Accordingly, high clutch H/C alone can transmit both of torque on the drive side and torque on the engine brake side During travel in direct mode, mode changeover solenoid unit 260 is held deenergized and signal pressure PsoIMC is zero (PsoIMC=0). Therefore, spool 175a of mode changeover valve 175 is at an upper position as shown in FIG. 11 so as to drain second fluid chamber 27 through ports 175g and 175f. In direct mode, this transmission system can use an entire speed ratio range from icrsp corresponding to revolution synchronous point RSP to a highest ratio ichi shown in FIG. 12.

<Operating Mode Changeover from Direct Mode to Power Recirculation Mode>

During forward travel in direct mode, the transmission system decreases control pressure Phc in high clutch control valve 180 by decreasing the ON duty ratio for controlling high clutch solenoid unit 190 until high clutch H/C is finally disengaged, and leaves only the first piston 11 of low clutch L/C in the actuated state. Thus, the transmission system shifts smoothly from direct mode to power recirculation mode.

<R Range>

During backward operation in R range, line pressure PL (D range pressure Pd) is not supplied from manual valve 230 to D range pressure circuit 107. Instead, line pressure PL (R range pressure Pr) is supplied from port 230g of manual valve 230 to R range pressure circuit 108. This pressure is supplied to second fluid chamber 27 through shuttle valve 271, and at the same time supplied to first fluid chamber 26 through shuttle valve 261. Therefore, first and second pistons 11 and 12 are both actuated to put low clutch L/C to the all-time engagement state shown in FIG. 7 and FIG. 10.

Line pressure PL (D range pressure Pd) is not supplied from manual valve 230 to D range pressure circuit 107, so that control pressure Phc is not produced. Drain port 246D of shift control valve 246 is connected through ports 230d and 230e of manual valve 230, to reverse torque shutoff valve 240. In R range, reverse torque shutoff valve 240 connects port 240e communicating with drain port 246D of shift control valve 246, with line pressure port 240d in the region in which the power roller tilt angle is equal to or smaller than a tile angle φr between a power roller tilt angle φgnp corresponding to neutral point GNP and tilt angle φchi on the smaller side where the CVT input/output speed ratio icvt is smaller (in the region in which the CVT input/output speed ratio icvt is greater than ratio icr shown in FIG. 12). Therefore, the pressure PHI supplied to fluid chamber 30B becomes equal to line pressure PL irrespective of whether the pressure is supplied to line pressure port 246P or to drain port 246D.

On the other hand, fluid pressure PLO in fluid chamber 30A is varied between line pressure PL and zero since drain port 246C is drained by pump intake passage 104. Therefore, the pressure difference control (speed ratio control) between chambers 30A and 30B is performed under the condition of PHI≧PLO in the region in which the tilt angle is smaller than a tilt angle φr (in the range of CVT input/output speed ratio icvt is greater than icr).

In the illustrated embodiment of the invention, clutch discs 24 and 25 serve as first means for making and breaking driving connection for clutch engagement and clutch disengagement. Cam member 31 includes a portion confronting the clutch pack of discs 24 and 25, and serving as second means for compressing the clutch discs 24 and 25. One or more of members 11 and 12 and portions defining fluid chambers 26 and 27 serve as third means for producing a clutch action to compress the clutch discs 24 and 25. Member 31 of the illustrated example further includes a portion which is formed with a contoured cam surface as shown in the sectional views of FIGS. 8A~10B, and which serves as part of the fourth means, interposed between the first means and the third means, for allowing the third means to force the second means (31) to compress the first means through the fourth means by producing an axial force to force the second means away from third means toward the first means when the fourth means receives drag torque from the first means through the second means. In the illustrated example, member 31 serves as a cam member on one hand, and as a pressure member for pushing the clutch pack of clutch discs 24 and 25 on the other hand. Friction reducing device in the form of rollers 32 serves as a component of the fourth means. Second piston 12 of the illustrated embodiment includes a portion for receiving the fluid pressure and serving as a piston, and a portion which is formed with a contoured cam surface as shown in the sectional views of FIG. 8A–10B, and which serves as part of the fourth means. The spring 29 can serve as fifth means for preventing the clutch pack (24 and 25) from being compressed in the case of FIG. 8A.

Snap ring 28 serves as a shift stopper to prevent the clutch pack from being compressed when the distance between the pressure member 31 and the second piston 12 is not increased, by holding the second piston 12 at the second position by limiting axial movement of the first piston 11 together with return spring 29 and the fluid pressure in first fluid chamber as shown in FIG. 6 and FIG. 9C. Return spring 29 acts to hold the second piston 12 at the first position to prevent the clutch pack from being compressed irrespective of whether the distance between the pressure member 31 and the second piston 12 is extended or not, as shown in FIG. 4 and FIG. 8A.

This application is based on a prior Japanese Patent Application No. 2001-006407. The entire contents of a Japanese Patent Application No. 2001-006407 with a filing date of Jan. 15, 2001 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A clutch apparatus comprising:

a clutch pack of clutch discs;

a pressure member to compress the clutch pack axially for clutch engagement;

a first piston to produce a clutch action to compress the clutch pack with the pressure member when the first piston is actuated by a first fluid pressure;

a second piston arranged to be moved from a first position to a second position toward the clutch pack by the first piston when actuated, and further from the second position to a third position toward the clutch pack when the second piston is actuated;

a friction reducing device, interposed between the second piston and the pressure member, to increase an axial distance between the pressure member and the second piston with the aid of a contoured cam surface when the second piston and the pressure member are rotated relative to each other, and thereby to push the pressure member to compress the clutch pack when the second piston is held at the second position;

a shift stopper to prevent the clutch pack from being compressed when the distance between the pressure member and the second piston is not increased, by holding the second piston at the second position by limiting axial movement of the first piston; and a return spring to normally hold the second piston at the first position to prevent the clutch pack from being compressed irrespective of whether the distance between the pressure member and the second piston is extended or not.

2. An apparatus for transmitting torque, the apparatus comprising:

a clutch pack of friction elements;

a clutch actuator to produce a clutch action to compress the clutch pack axially for clutch engagement, the actuator comprising a clutch piston to move toward the clutch pack when the clutch piston is actuated; and a torque cam mechanism interposed between the clutch pack and the clutch piston, the torque cam mechanism comprising a cam member to extend the torque cam mechanism axially in response to a relative rotation across the torque cam mechanism, and the torque cam mechanism being arranged to compress the clutch pack axially when the clutch piston is actuated and simultaneously the torque cam mechanism is extended axially, wherein the torque cam mechanism is arranged to leave the clutch pack uncompressed even if the torque cam is extended axially as long as the clutch piston is not actuated.

3. The apparatus as claimed in claim 2, wherein the torque cam mechanism is moved axially from a first position to a second position toward the clutch pack when the clutch piston is brought from an unactuated state to an actuated state; and the torque cam mechanism compresses the clutch pack when the torque cam mechanism is extended axially at the second position whereas the torque cam mechanism leaves an axial clearance between the clutch pack and the torque cam mechanism to leave the clutch pack uncompressed even when the torque cam mechanism is extended axially to a maximum extent as long as the torque cam mechanism is located at the first position, and the torque cam mechanism leaves an axial clearance between the clutch pack and the torque cam mechanism to leave the clutch pack uncompressed when the torque cam mechanism is not extended axially at the second position.

4. The apparatus as claimed in claim 3, wherein, in addition to the cam member which is a first cam member, the torque cam mechanism further comprises a second cam member; and the first and second cam members are arranged to move axially away from each other to extend the torque cam mechanism axially in response to relative rotation between the first and second members, and thereby to allow the clutch piston to compress the clutch pack through the torque cam mechanism when the clutch piston is actuated.

5. The apparatus as claimed in claim 4, wherein the apparatus further comprises a rotation stopper to limit the relative rotation between the first and second cam members.

6. The apparatus as claimed in claim 4, wherein the torque cam mechanism is arranged to extend axially when the relative rotation between the first and second cam members is in a first rotational direction whereas the torque cam mechanism is not extended when the relative rotation between the first and second members is in a second rotational direction opposite to the first rotational direction.

7. The apparatus as claimed in claim 6, wherein the apparatus further comprises a rotation stopper to limit the relative rotation between the first and second cam members in the first rotational direction.

8. The apparatus as claimed in claim 6, wherein the apparatus further comprises a rotation stopper to limit the relative rotation between the first and second cam members in the second rotational direction.

9. The apparatus as claimed in claim 6, wherein the clutch actuator is arranged to further shift the torque cam mechanism axially from the second position to a third position toward the clutch pack, and thereby to compress the clutch pack without resorting to the axial extension of the torque cam mechanism.

10. The apparatus as claimed in claim 9, wherein the clutch actuator comprises a first fluid chamber for forcing the clutch piston to push the torque cam mechanism from the first position to the second position, and a second fluid chamber for forcing the torque cam mechanism to move from the second position to the third position.

11. The apparatus as claimed in claim 10, wherein the apparatus further comprises a shift stopper to limit axial movement of the clutch piston and to hold the clutch piston at a limit position to hold the torque cam mechanism at the second position, and a return spring to urge the torque cam mechanism toward the first position.

12. The apparatus as claimed in claim 10, wherein the second cam member serves as a second piston upon which a fluid pressure in the second fluid chamber acts.

13. An apparatus for transmitting torque, the apparatus comprising:
   a clutch pack of friction elements;
   a clutch actuator to produce a clutch action to compress the clutch pack axially for clutch engagement, the actuator comprising a clutch piston to move toward the clutch pack when the clutch piston is actuated; and
   a torque cam mechanism interposed between the clutch pack and the clutch piston,
   wherein the torque cam mechanism comprising first and second cam members arranged to move axially away from each other to extend the torque cam mechanism axially in response to relative rotation between the first and second cam members, and thereby to allow the clutch piston to compress the clutch pack through the torque cam mechanism when the clutch piston is actuated, and
   wherein the apparatus comprises a first rotating member, a second rotating member and a third rotating member; the clutch pack is interposed between the second and third rotating members, for making and breaking driving connection between the second and third rotating members; the second rotating member comprises an engaging portion engaging with the first rotating member so that the first and second rotating members are rotatable to a limited extent relative to each other; the second cam member is engaged with the first rotating member so that the second cam member and the first rotating member rotate as a unit; and the first cam member is engaged with the second rotating member so that the first cam member and the second rotating member rotate as a unit.

14. The apparatus as claimed in claim 13, wherein the second rotating member is a clutch drum and the third rotating member is a clutch hub received in the clutch drum.

15. An apparatus for transmitting torque, the apparatus comprising:
   a clutch pack of friction elements;
   a clutch actuator to produce a clutch action to compress the clutch pack axially for clutch engagement, the actuator comprising a clutch piston to move toward the clutch pack when the clutch piston is actuated; and
   a torque cam mechanism interposed between the clutch pack and the clutch piston,
   the torque cam mechanism comprising a cam member to extend the torque cam mechanism axially in response to a relative rotation across the torque cam mechanism, and
   the torque cam mechanism being arranged to compress the clutch pack axially when the clutch piston is actuated and simultaneously the torque cam mechanism is extended axially,
   wherein the apparatus further comprises:
      a first clutch which comprises the clutch pack, the clutch actuator and the torque cam mechanism;
      an input member;
      an output member;
      a planetary gear set comprising a first planetary gear element, a second planetary gear element and a third planetary gear element connected with the output member;
      a continuously variable transmission connected between the input member and the second planetary gear element;
      an invariable transmission connected in series with the first clutch, a series combination of the invariable transmission and the first clutch being connected between the input member and the first planetary gear element; and
      a second clutch connected between the second planetary gear element and the output member.

16. The apparatus according to claim 15, wherein the apparatus is an infinitely variable transmission to vary an output/input speed ratio of the speed of the output member to the speed of the input member to zero so as to reduce the speed of the output member to zero.

17. A clutch apparatus comprising:
   first means for making driving connection for clutch engagement by surface friction when compressed and breaking the driving connection when released;
   second means for compressing the first means to effect the clutch engagement;
   third means for producing a clutch action to force the second means to compress the first means when the third means is actuated;
   fourth means, interposed between the first means and the third means, for allowing the third means to force the second means to compress the first means through the fourth means by producing an axial force to force the second means away from third means toward the first means when the fourth means receives drag torque from the first means through the second means; and
   fifth means for normally holding the third means at a position to prevent the first means from being compressed even if the axial force is produced by the fourth means in response to the drag torque when the third means is not actuated.

* * * * *